United States Patent
Uehara

(10) Patent No.: US 7,512,819 B2
(45) Date of Patent: Mar. 31, 2009

(54) METHOD AND APPARATUS FOR EJECTING A REMOVABLE MEDIUM BY TEMPORARILY PROVIDING POWER AFTER A SECONDARY EJECT SWITCH IS OPERATED

(75) Inventor: Keiichi Uehara, Ome (JP)

(73) Assignee: Kabushiki Kaisha Toshiba, Tokyo (JP)

(\*) Notice: Subject to any disclaimer, the term of this patent is extended or adjusted under 35 U.S.C. 154(b) by 443 days.

(21) Appl. No.: 11/340,188

(22) Filed: Jan. 26, 2006

(65) Prior Publication Data

US 2006/0200693 A1 Sep. 7, 2006

(30) Foreign Application Priority Data

Mar. 2, 2005 (JP) ............................. 2005-057833

(51) Int. Cl.
*G06F 1/26* (2006.01)
*G06F 1/32* (2006.01)

(52) U.S. Cl. .................. 713/320; 713/300; 713/324; 720/628; 720/636

(58) Field of Classification Search .................. 713/300, 713/320, 324; 720/628, 636
See application file for complete search history.

(56) References Cited

U.S. PATENT DOCUMENTS

| | | | | |
|---|---|---|---|---|
| 6,038,672 | A * | 3/2000 | Klein | 713/322 |
| 6,865,621 | B2 * | 3/2005 | Iwata | 710/20 |
| 7,130,994 | B2 * | 10/2006 | Lin et al. | 713/1 |
| 2001/0056509 | A1 * | 12/2001 | Iwata | 710/20 |
| 2002/0015375 | A1 * | 2/2002 | Tanaka et al. | 369/77.1 |
| 2003/0043702 | A1 | 3/2003 | Lee et al. | |
| 2005/0033999 | A1 * | 2/2005 | Nishikawa | 713/300 |

FOREIGN PATENT DOCUMENTS

| | | |
|---|---|---|
| JP | 10-143982 | 5/1998 |
| JP | 11-149689 | 6/1999 |
| JP | 2004-185780 | * 2/2004 |
| JP | 2004-185780 | 7/2004 |

\* cited by examiner

*Primary Examiner*—Thomas Lee
*Assistant Examiner*—Jaweed A Abbaszadeh
(74) *Attorney, Agent, or Firm*—Blakely, Sokoloff, Taylor & Zafman LLP

(57) ABSTRACT

According to one embodiment, an information processing apparatus includes a main body, a disc drive unit drives a removable medium, a first switch and a second switch which are provided on the main body, a unit which powers on the main body in response to an operation of one of the first switch and the second switch, a unit which determines whether a factor of the power-on of the main body is the operation of the first switch or the operation of the second switch, and a unit which executes a process for booting up an operating system if the factor of the power-on is the operation of the first switch, and executes a process for sending an eject command to the disc drive unit to eject the removable medium and then powering off the main body if the factor of the power-on is the operation of the second switch.

14 Claims, 4 Drawing Sheets

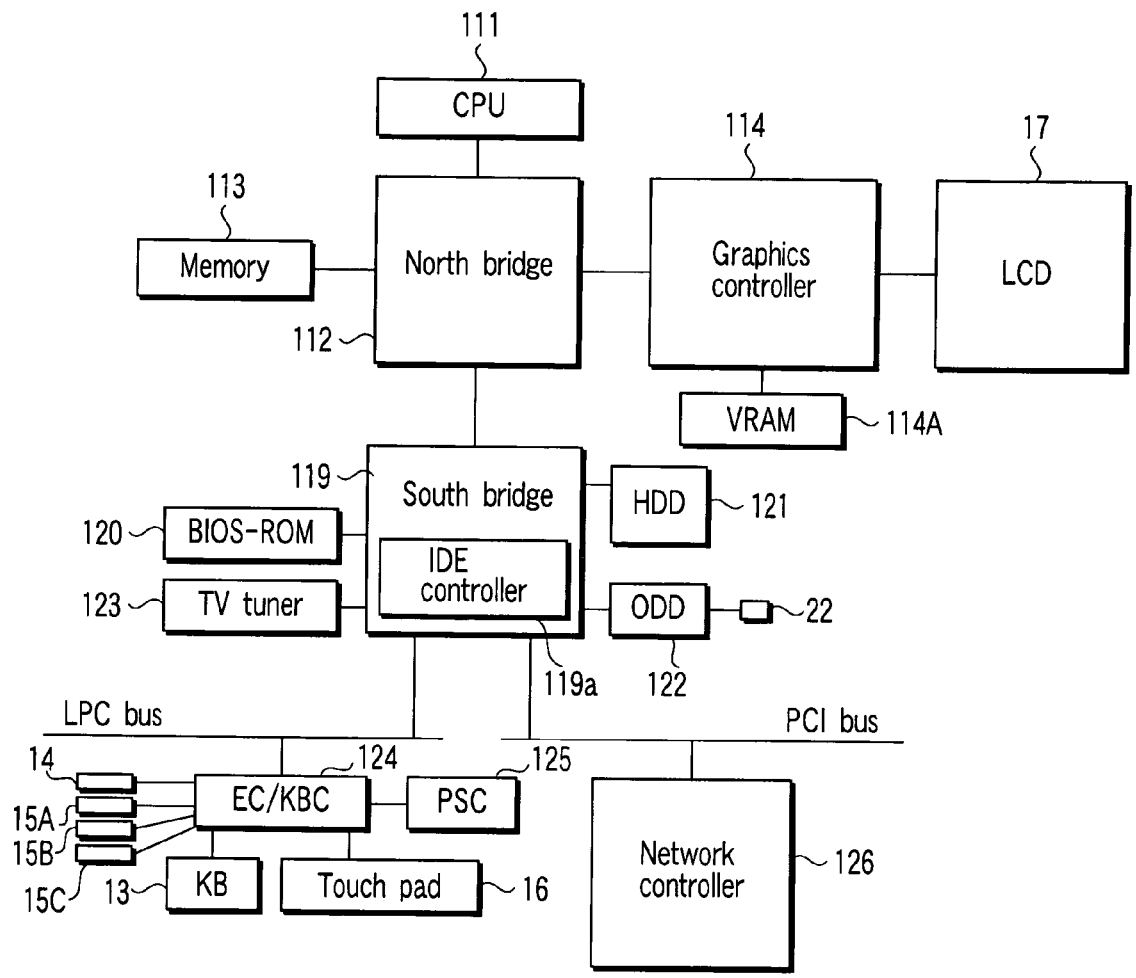
F I G. 2

METHOD AND APPARATUS FOR EJECTING A REMOVABLE MEDIUM BY TEMPORARILY PROVIDING POWER AFTER A SECONDARY EJECT SWITCH IS OPERATED

CROSS-REFERENCE TO RELATED APPLICATIONS

This application is based upon and claims the benefit of priority from prior Japanese Patent Application No. 2005-057833, filed Mar. 2, 2005, the entire contents of which are incorporated herein by reference.

BACKGROUND

1. Field

One embodiment of the invention relates to an information processing apparatus such as a personal computer, and a control method for controlling the operation of the information processing apparatus.

2. Description of the Related Art

In general, an information processing apparatus such as a personal computer is equipped with a disc drive unit that drives removable media such as a DVD (Digital Versatile Disc) and a CD (Compact Disc).

The disc drive unit includes an eject button for ejecting removable media. When the eject button is operated, a tray loading mechanism of the disc drive unit operates to open the disc tray. This enables the user to remove/change the removable media.

However, while no power is being supplied to the disc drive unit, the tray loading mechanism cannot be operated. In the case where the personal computer is powered off, no power is supplied to the disc drive unit. Thus, in the state in which the personal computer is powered off, the removable media cannot be removed/changed.

To solve this problem, in most of disc drive units, an emergency eject mechanism is provided for forcibly opening a disc tray while no power is supplied to the disc drive unit. However, in order to operate the emergency eject mechanism, it is necessary to give a push into an eject hole by means of a tool. Thus, the emergency eject mechanism is not satisfactory in terms of operability. In addition, in the case of a slot-in type disc drive unit that has no openable disc tray, it is difficult, because of the loading structure, to provide the disc drive unit with an emergency eject mechanism that forcibly eject media.

Jpn. Pat. Appln. KOKAI Publication No. 11-149689 discloses a disc drive unit having a function of supplying an activation signal to an external power supply circuit when an eject button is pressed. If the eject button is pressed, power is automatically supplied to the disc drive unit to open the disc tray.

In the technique of KOKAI 11-149689, however, it is necessary to provide the disc drive unit with a special interface for supplying the activation signal to the external power supply circuit. This leads to an increase in cost of the disc drive unit. In the field of personal computers, there is a demand for realizing the use of disc drive units having standard interfaces. It is necessary, therefore, to realize a novel function that enables ejection of removable media without using a special disc drive unit.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram that shows a system configuration of the computer shown in FIG. 1;

DETAILED DESCRIPTION

Various embodiments according to the invention will be described hereinafter with reference to the accompanying drawings. In general, according to one embodiment of the invention, an information processing apparatus includes a disc drive unit which is provided in a main body and drives a removable medium, a first switch and a second switch which are provided on the main body, a power supply control unit which is provided in the main body and powers on the main body in response to an operation of one of the first switch and the second switch, a unit which determines, in response to power-on of the main body, whether a factor of the power-on of the main body is the operation of the first switch or the operation of the second switch, and a unit which executes a first process for booting up an operating system in a case where the factor of the power-on of the main body is the operation of the first switch, and executes a second process for sending an eject command to the disc drive unit to eject the removable medium and then powering off the main body in a case where the factor of the power-on of the main body is the operation of the second switch.

Figure 1:
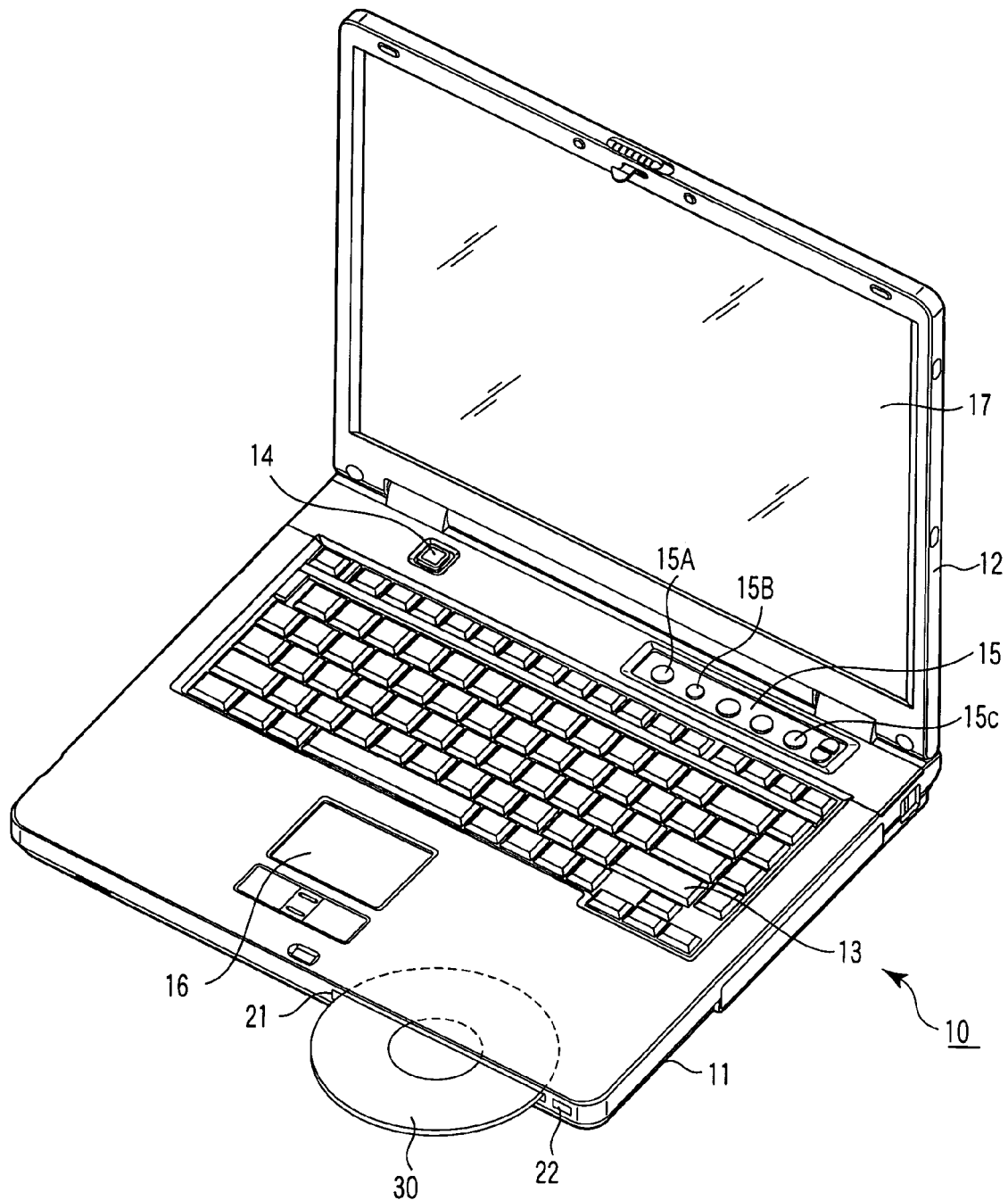
FIG. 1 is an exemplary perspective view that schematically shows the external appearance of a computer according to an embodiment of the invention.

To begin with, referring to FIG. 1 and FIG. 2, the structure of an information processing apparatus according to an embodiment of the invention is described. The information processing apparatus is realized, for instance, as a notebook personal computer 10.

FIG. 1 is a perspective view that shows the external appearance of the notebook personal computer 10 in the state in which a display unit of the computer 10 is opened. The computer 10 comprises a computer main body 11 and a display unit 12. A display device that is composed of a TFT-LCD (Thin Film Transistor Liquid Crystal Display) 17 is built in the display unit 12. The display screen of the LCD 17 is positioned at an approximately central part of the display unit 12.

The display unit 12 is attached to the computer main body 11 such that the display unit 12 is freely rotatable between an open position and a closed position. The computer main body 11 has a thin box-shaped casing. A keyboard 13, a power button 14 for powering on/off the computer 10, an input operation panel 15 and a touch pad 16 are disposed on the top surface of the computer main body 11.

The input operation panel 15 is an input device that inputs an event corresponding to a pressed button. The input operation panel 15 has a plurality of button switches for activating a plurality of functions. The button switches include a TV activation button switch 15A and a DVD/CD activation button switch 15B. The TV activation button switch 15A is a button switch for activating a TV function for reproducing and recording TV broadcast program data. When the TV activation button switch 15A is pressed by the user, a TV application program for executing the TV function is automatically started. The DVD/CD activation button switch 15B is a button switch for activating an AV function for reproducing AV (audio/video) data that is stored on a DVD/CD medium. When the DVD/CD activation button switch 15B is pressed by the user, an AV application program for reproducing AV (audio/video) data, which is stored on a DVD/CD medium loaded in the personal computer 10, is automatically started.

In this computer 10, a general-purpose main operating system and a purpose-specific sub-operating system for viewing/listening of TV broadcast program data and for reproduction of AV (audio/video) data are installed. The TV application program and AV application program are AV reproduction programs that run on the sub-operating system.

When the power button 14 is pressed by the user, the main operating system is booted up. On the other hand, when the TV activation button switch 15A or DVD/CD activation button switch 15B is pressed by the user, the sub-operating system, and not the main operating system, is booted up, and the TV application program or AV application program is automatically executed. The sub-operating system has only a minimum function for executing the AV function. Thus, the time that is needed to boot up the sub-operating system is much shorter than the time that is needed to boot up the main operating system. Hence, only by pressing the TV activation button switch 15A or DVD/CD activation button switch 15B, the user can immediately execute TV viewing/listening or AV reproduction.

The input operation panel 15 further includes a first eject button switch 15C. The first eject button switch 15C is a button switch for ejecting from the computer 10 a removable medium 30, which is composed of an optical storage medium such as DVD/CD media, while the computer 10 is powered off. When the user presses the first eject button switch 15C during the power-off of the computer 10, the computer 10 is temporarily powered on to automatically execute a process for ejecting the removable medium 30 from the optical disc drive unit that is built in the computer main body 11. When the computer 10 is powered on by the operation of the first eject button switch 15C, neither the main operating system nor the sub-operating system is booted up. Thus, the eject process is immediately executed upon the operation of the first eject button switch 15C. In addition, the LCD 17 is kept in the OFF state. After the completion of the eject process, the computer 10 is automatically powered off unless a special event occurs.

As described above, when the first eject button switch 15C is operated, the process for powering on the computer 10 and the process for powering off the computer 10 are executed, out of the view of the user. The user can thus remove the removable medium 30 from the computer 10, without taking care of whether the computer 10 is in the ON state or OFF state.

The optical disc drive unit that is built in the computer 11 is composed of a slot-in type drive unit having no disc tray. The optical disc drive unit has a slot 21 for loading/ejecting the removable medium 30. The slot 21 is exposed to the front surface of the computer main body 11. A second eject button switch 22, which is connected to the optical disc drive unit, is disposed on the front surface of the computer main body 11. When the second eject button switch 22 is pressed by the user in the state in which the computer 10 is powered on, the disc drive unit executes a process for ejecting the removable medium 30 via the slot 21.

FIG. 2 shows the system configuration of the computer 10.

The computer 10, as shown in FIG. 2, comprises a CPU 111, a north bridge 112, a main memory 113, a graphics controller 114, a south bridge 119, a BIOS-ROM 120, a hard disk drive (HDD) 121, an optical disc drive (ODD) 122, a TV tuner 123, an embedded controller/keyboard controller IC (EC/KBC) 124, a power supply controller (PSC) 125 and a network controller 126.

The CPU 111 is a processor that is provided in order to control the operation of the computer 10. The CPU 111 executes the main operating system/sub-operating system and various application programs, which are loaded from the hard disk drive (HDD) 121 into the main memory 113. In addition, the CPU 111 executes a BIOS (Basic Input/Output System) that is stored in the BIOS-ROM 120. The BIOS is a program for hardware control. The BIOS executes a process of booting the main operating system when the computer 10 is powered on by the operation of the power button switch 14. On the other hand, when the computer 10 is powered on by the operation of the first eject button switch 15C, the BIOS sends an eject command for instructing the ejection of the removable medium 30 to the optical disc drive unit (ODD) 122, without executing the process of booting the main operating system. The BIOS powers off the computer 10 upon completion of the command process (eject process) that is executed by the optical disc drive unit (ODD) 122 in response to the eject command.

The north bridge 112 is a bridge device that connects a local bus of the CPU 111 and the south bridge 119. The north bridge 112 includes a memory controller that access-controls the main memory 113. The north bridge 112 has a function of executing communication with the graphics controller 114 via, e.g. an AGP (Accelerated Graphics Port) bus.

The graphics controller 114 is a display controller for controlling the LCD 17 that is used as a display monitor of the computer 10. The graphics controller 114 generates a display signal, which is to be sent to the LCD 17, on the basis of video data that is written in a video memory (VRAM) 114A.

The south bridge 119 controls the devices on an LPC (Low Pin Count) bus, and the devices on a PCI (Peripheral Component Interconnect) bus. In addition, the south bridge 119 includes an IDE (Integrated Drive Electronics) controller 119a for controlling the HDD 121 and optical disc drive (ODD) 122. The eject command is sent to the optical disc drive (ODD) 122 via the IDE controller 119a.

The south bridge 119 also includes a function of controlling the TV tuner 123 and a function of access-controlling the BIOS-ROM 120.

The HDD 121 is a storage device that stores various software and data. The optical disc drive (ODD) 122 is a drive unit for driving removable media, such as a DVD or a CD, on which AV content is stored. The optical disc drive (ODD) 122 is composed of a slot-in type drive unit that has no openable disc tray. The optical disc drive (ODD) 122 is not equipped with an emergency eject mechanism for forcibly ejecting removable media. The TV tuner 123 is a receiver for receiving broadcast program data such as TV broadcast program data from outside.

The embedded controller/keyboard controller IC (EC/KBC) 124 is a 1-chip microcomputer in which an embedded controller for power management and a keyboard controller for controlling the keyboard (KB) 13 and touch pad 16 are integrated. The embedded controller/keyboard controller IC (EC/KBC) 124 is a power supply control unit which powers on the computer 10, i.e., the computer main body 11. The embedded controller/keyboard controller IC (EC/KBC) 124 is supplied with operation power from the power supply controller (PSC) 125 even while the computer 10 is in the power-off state. In response to the user's operation of the power button switch 14 or the first eject button switch 15C, the embedded controller/keyboard controller IC (EC/KBC) 124 cooperates with the power supply controller (PSC) 125 to execute the process of powering on the computer 10, i.e., the computer main body 11. When the computer 10, i.e., the computer main body 11 is powered on, almost all the devices, except the LCD 17, are turned on. In addition, the embedded controller/keyboard controller IC (EC/KBC) 124 can power on the computer 10, i.e., the computer main body 11 in response to the user's operation of the TV activation button switch 15A or DVD/CD activation button switch 15B.

Figure 3:
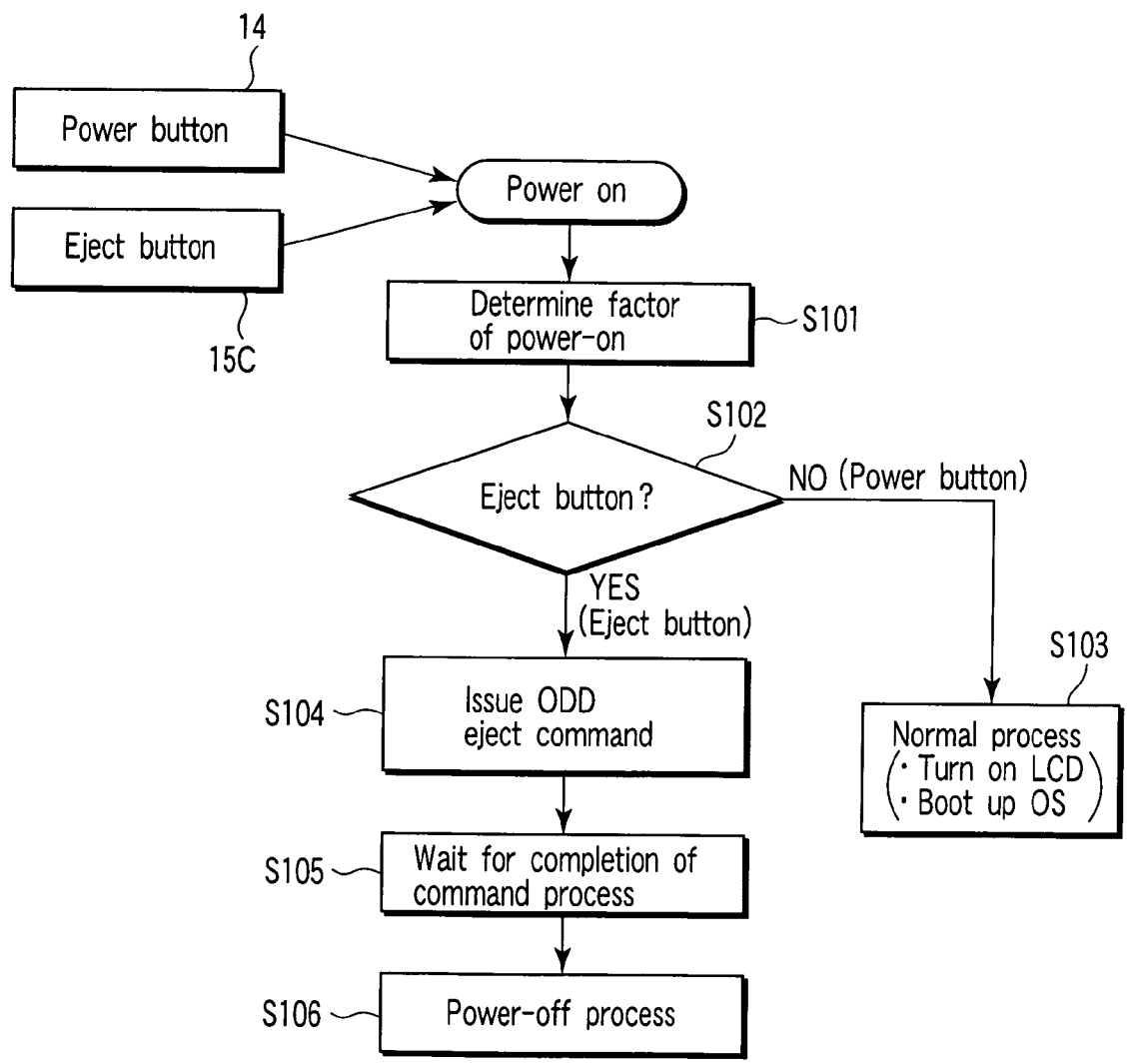
FIG. 3 is an exemplary flow chart that illustrates a first example of the procedure of a process that is executed at a time of power-on of the computer shown in FIG. 1.

Next, referring to a flow chart of FIG. 3, a description is given of a first example of the procedure of a process that is executed by the BIOS at a time of power-on of the computer 10.

As described above, when the user operates the power button switch 14 or first eject button switch 15C, the computer 10, i.e., the computer main body 11 is powered on. Operation power supply to the LCD 17 is gated, and the LCD 17 is kept in the OFF state. The LCD 17 is provided with a backlight as a light source. Thus, the backlight may be turned off, instead of gating the operation power supply to the LCD 17.

When the computer 10, i.e., the computer main body 11 is powered on, the CPU 111 first executes the BIOS. The BIOS refers to a status register in the embedded controller/keyboard controller IC (EC/KBC) 124, and determines whether the factor of power-on of the computer 10 is the operation of the power button switch 14 or the operation of the eject button switch 15C (step S101).

If the factor of the power-on is the operation of the power button switch 14 (NO in step S102), the BIOS executes a normal process (step S103). In the normal process, the BIOS executes the process for turning on the LCD 17 (e.g. the process for turning on the backlight) and the process for booting up the main operating system.

On the other hand, if the factor of the power-on is the operation of the first eject button switch 15C (YES in step S102), the BIOS executes an eject control process for delivering an eject command to the optical disc drive unit (ODD) 122 to eject the removable medium, and then powering off the computer 10 (steps S104 to S105).

In the eject control process, the BIOS first sends the eject command (ODD eject command) for instructing ejection of the removable medium to the optical disc drive unit (ODD) 122 via the IDE controller 119a, thus instructing the optical disc drive unit (ODD) 122 to eject the removable medium (step S104). Responding to the eject command, the optical disc drive unit (ODD) 122 starts a command process for ejecting the removable medium that is set in the optical disc drive unit (ODD) 122, and ejects the removable medium via the slot 21. The BIOS waits for the completion of the command process that is executed by the optical disc drive unit (ODD) 122 (step S105). When the command process is completed, the optical disc drive unit (ODD) 122 sets a status flag, which is indicative of the completion of the command process, in a control register that is provided in the IDE controller 119a. When the status flag is set, the BIOS confirms the completion of the command process, that is, the ejection of the removable medium. The BIOS sends a power-off command for instructing power-off of the computer 10, i.e., the computer main body 11 to the embedded controller/keyboard controller IC (EC/KBC) 124, thereby powering off the computer 10, i.e., the computer main body 11 (step S106).

In the present embodiment, as described above, if the computer 10, i.e., the computer main body 11 is powered on by the operation of the first eject button switch 15C, the process for sending the eject command to the optical disc drive unit (ODD) 122 is automatically executed, and then the computer 10, i.e., the computer main body 11 is powered off. Thus, the removable medium can easily be removed/changed at any time, without using a special optical disc drive (ODD).

In the description of FIG. 3, when the power button switch 14 or first eject button switch 15C is operated, almost all devices, except the LCD 17, are powered on. Alternatively, only the optical disc drive (ODD) 122 and the devices that are necessary for sending the command to the optical disc drive (ODD) 122 may be turned on. In this case, in step S103, the BIOS cooperates with the EC/KBC 124 to execute the process for powering on the devices that are in the OFF state.

Actually, the computer 10 is powered on, not only when the power button switch 14 or first eject button switch 15C is operated, but also when the TV activation button switch 15A or DVD/CD activation button switch 15B is operated. If the factor of power-on of the computer 10 is the operation of the TV activation button switch 15A or DVD/CD activation button switch 15B, the BIOS executes AV reproduction software (sub-operating system, AV reproduction program).

Figure 4:
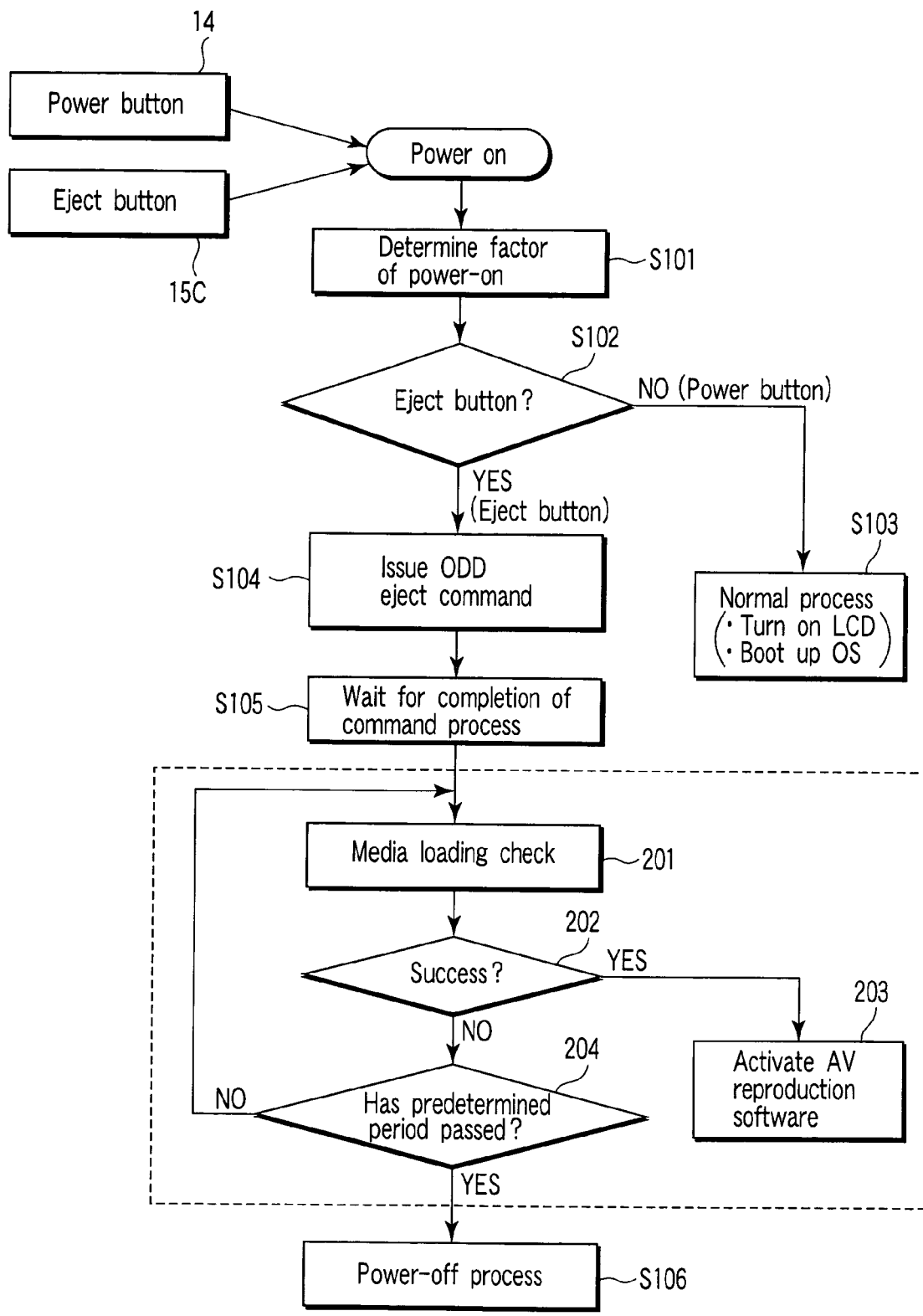
FIG. 4 is an exemplary flow chart that illustrates a second example of the procedure of the process that is executed at a time of power-on of the computer shown in FIG. 1.

Next, referring to a flow chart of FIG. 4, a description is given of a second example of the procedure of the process that is executed by the BIOS at a time of power-on of the computer 10.

In the procedure illustrated in FIG. 4, a media loading check control process (steps S201 to S204) is added in the eject control process.

Specifically, in the eject control process, the BIOS first sends the eject command (ODD eject command) for instructing ejection of the removable medium to the optical disc drive unit (ODD) 122 via the IDE controller 119a, thus instructing the optical disc drive unit (ODD) 122 to eject the removable medium (step S104). Responding to the eject command, the optical disc drive unit (ODD) 122 starts a command process for ejecting the removable medium that is set in the optical disc drive unit (ODD) 122, and ejects the removable medium via the slot 21. The BIOS waits for the completion of the command process that is executed by the optical disc drive unit (ODD) 122 (step S105). When the command process is completed, the optical disc drive unit (ODD) 122 sets a status flag, which is indicative of the completion of the command process, in a control register that is provided in the IDE controller 119a. When the status flag is set, the BIOS confirms the completion of the command process, that is, the ejection of the removable medium. Subsequently, the BIOS determines whether an event, in which a removable medium is loaded in the optical disc drive unit (ODD) 122, occurs during a predetermined time period after the ejection of the removable medium (step S201). In step S201, for example, the BIOS sends to the optical disc drive unit (ODD) 122 a command (e.g. TEST UNIT READY command) for confirming whether the optical disc drive unit (ODD) 122 is in such a state as to be able to drive a removable medium, that is, whether a removable medium is loaded in the optical disc drive unit (ODD) 122, thereby confirming the current state of the optical disc drive unit (ODD) 122.

If an event, in which a removable medium is loaded in the optical disc drive unit (ODD) 122, occurs during the predetermined time period after the ejection of the removable medium (YES in step S202), the BIOS determines that a new removable medium is loaded in the optical disc drive unit (ODD) 122 and activates the AV reproduction software (sub-operating system, AV reproduction program) for reproducing data that is stored on the loaded removable medium (step S203). In step S203, the BIOS also executes a process for turning on the LCD 17 (e.g. the process for turning on the backlight).

On the other hand, if an event, in which a removable medium is loaded in the optical disc drive unit (ODD) 122, does not occur during the predetermined time period after the ejection of the removable medium (NO in step S204), the BIOS sends a power-off command for instructing power-off of the computer 10, i.e., the computer main body 11 to the embedded controller/keyboard controller IC (EC/KBC) 124, thereby powering off the computer 10, i.e., the computer main body 11 (step S106).

By the media loading check control process, the user can view/listen to AV data on a newly loaded medium only by changing media.

The function of the first eject button switch 15C may also be realized by a specific key switch or a combination of specific key switches on the keyboard 13.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
    a main body;
    a display unit coupled to the main body, the display unit being rotatable between an open position and a closed position with respect to the main body;
    a disc drive unit which is provided in the main body and drives a removable medium;
    an eject switch being disposed on the surface of the main body and coupled to the disc drive to eject the removable medium, the eject switch being operable in the state in which the disc drive is powered on;
    a first switch and a second switch which are provided on the main body, the second switch being covered by the display unit in the closed position to prevent the second switch from being operated;
    a power supply control unit which is provided in the main body and powers on the main body in response to an operation of one of the first switch and the second switch;
    means for determining, in response to power-on of the main body, whether a factor of the power-on of the main body is the operation of the first switch or the operation of the second switch; and
    means for executing a first process for booting up an operating system in a case where the factor of the power-on of the main body is the operation of the first switch, and executing a second process for sending an eject command to the disc drive unit to eject the removable medium and then powering off the main body in a case where the factor of the power-on of the main body is the operation of the second switch.

2. The information processing apparatus according to claim 1, wherein the second process is executed in a state in which a display unit of the information processing apparatus is turned off.

3. The information processing apparatus according to claim 1, wherein the second process includes a process of sending the eject command to the disc drive unit to eject the removable medium, a process of determining whether an event, in which a removable medium is loaded in the disc drive unit, occurs during a predetermined time period after the ejection of the removable medium, and a process of activating software for reproducing data that is stored on the loaded removable medium in a case where the event occurs during the predetermined time period.

4. The information processing apparatus according to claim 1, wherein the second process includes a process of sending the eject command to the disc drive unit to eject the removable medium, a process of determining whether an event, in which a removable medium is loaded in the disc drive unit, occurs during a predetermined time period after the ejection of the removable medium, and a process of powering off the main body in a case where the event does not occur during the predetermined time period.

5. The information processing apparatus according to claim 1, wherein the disc drive unit is a slot-in type drive unit.

6. The information processing apparatus according to claim 1, further comprising a display unit which is attached to the main body, wherein the power supply control unit is configured to power on the main body in a state in which the display unit is turned off, in response to the operation of one of the first switch and the second switch, and the first process includes a process of turning on the display unit.

7. A control method for controlling an information processing apparatus including a disc drive unit which drives a removable medium, comprising:
    powering on the information processing apparatus in response to an operation of one of a first switch and a second switch that are provided in the information processing apparatus, the second switch being provided on a main body and being covered by a display unit in a closed position with respect to the main body to prevent the second switch from being operated;
    determining, in response to power-on of the information processing apparatus, whether a factor of the power-on of the information processing apparatus is the operation of the first switch or the operation of the second switch;
    executing a first process for booting up an operating system in a case where the factor of the power-on of the information processing apparatus is the operation of the first switch; and
    executing a second process for sending an eject command to the disc drive unit to eject the removable medium and then powering off the information processing apparatus in a case where the factor of the power-on of the information processing apparatus is the operation of the second switch.

8. The control method according to claim 7, wherein the second process is executed in a state in which a display unit of the information processing apparatus is turned off.

9. The control method according to claim 7, wherein the second process includes a process of sending the eject command to the disc drive unit to eject the removable medium, a process of determining whether an event, in which a removable medium is loaded in the disc drive unit, occurs during a predetermined time period after the ejection of the removable medium, and a process of activating software for reproducing data that is stored on the loaded removable medium in a case where the event occurs during the predetermined time period.

10. The control method according to claim 7, wherein the second process includes a process of sending the eject command to the disc drive unit to eject the removable medium, a process of determining whether an event, in which a removable medium is loaded in the disc drive unit, occurs during a predetermined time period after the ejection of the removable medium, and a process of powering off the information processing apparatus in a case where the event does not occur during the predetermined time period.

11. The control method according to claim 7, wherein the disc drive unit is a slot-in type drive unit.

12. The control method according to claim 7, wherein the information processing apparatus includes a display unit, the powering on the information processing apparatus includes a step of powering on the information processing apparatus in a state in which the display unit is turned off in response to the operation of one of the first switch and the second switch, and the control method further comprises turning on the display unit in a case where the factor of the power-on of the information processing apparatus is the operation of the first switch.

13. An information processing apparatus comprising:
   a main body;
   a display unit coupled to the main body, the display unit being rotatable between an open position and a closed position with respect to the main body;
   a disc drive unit which is provided in the main body and drives a removable medium;
   a first eject switch being disposed on a side surface of the main body and coupled to the disc drive to eject the removable medium, the eject switch being operable in the state in which the disc drive is powered on; and
   a second eject switch being provided on the main body and covered by the display unit in the closed position to prevent the second switch from being operated, the second eject switch being operable in a state in which the disc drive is powered off by causing (i) the main body to be powered on, (ii) an eject command to be sent to the disc drive unit to eject the removable medium, and (iii) the main body to be powered off after completion of the eject command.

14. The information processing apparatus according to claim 13, wherein the second eject switch is positioned on a top surface of the main body between a keyboard positioned on the main body and a rear side surface of the main body, the second eject switch, when actuated, to send an eject command to the disc drive unit to eject the removable medium.

* * * * *